Nov. 15, 1960 — E. S. DEWICK — 2,960,667
VARIABLE NETWORK CONTROL
Filed Sept. 24, 1958 — 3 Sheets-Sheet 1
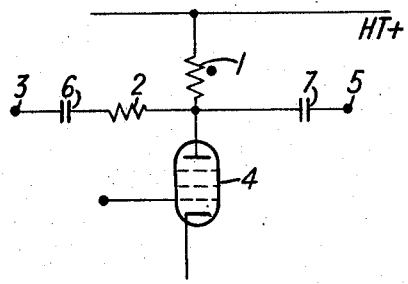
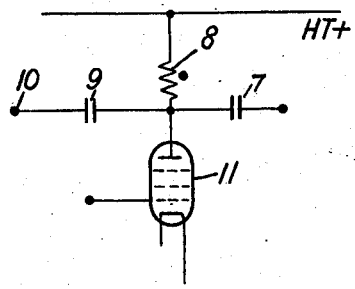
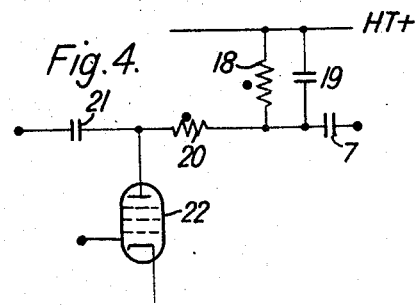
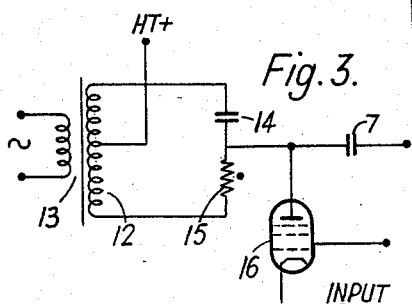
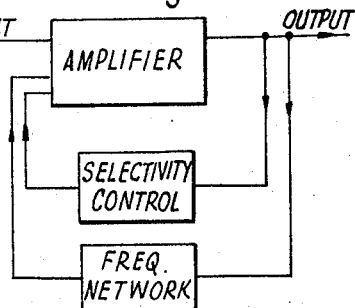
Inventor
Edmund S. Dewick
By Wenderoth, Lind & Ponack
Attorneys Nov. 15, 1960   E. S. DEWICK   2,960,667
VARIABLE NETWORK CONTROL Filed Sept. 24, 1958   3 Sheets-Sheet 2

Inventor
Edmund S. Dewick
By
Wenderoth, Lind + Ponack
Attorneys

Nov. 15, 1960
E. S. DEWICK
2,960,667
VARIABLE NETWORK CONTROL
Filed Sept. 24, 1958
3 Sheets-Sheet 3
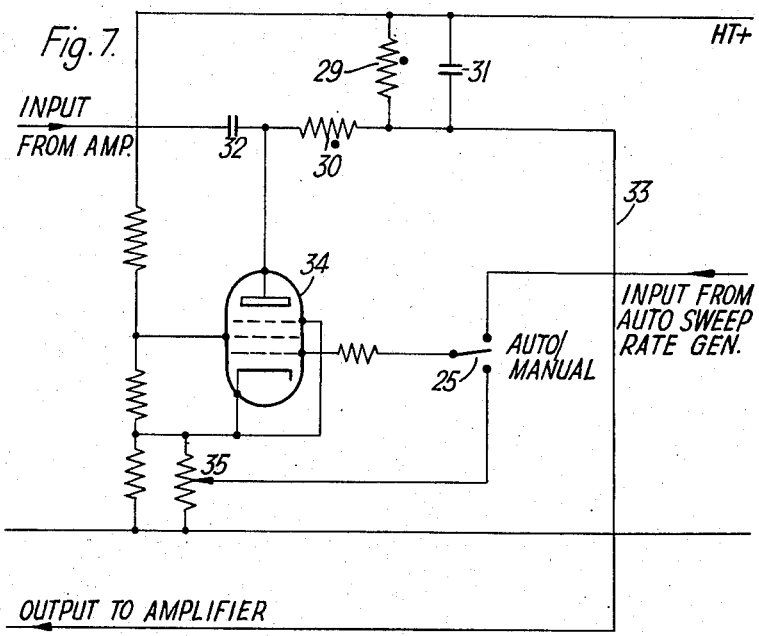
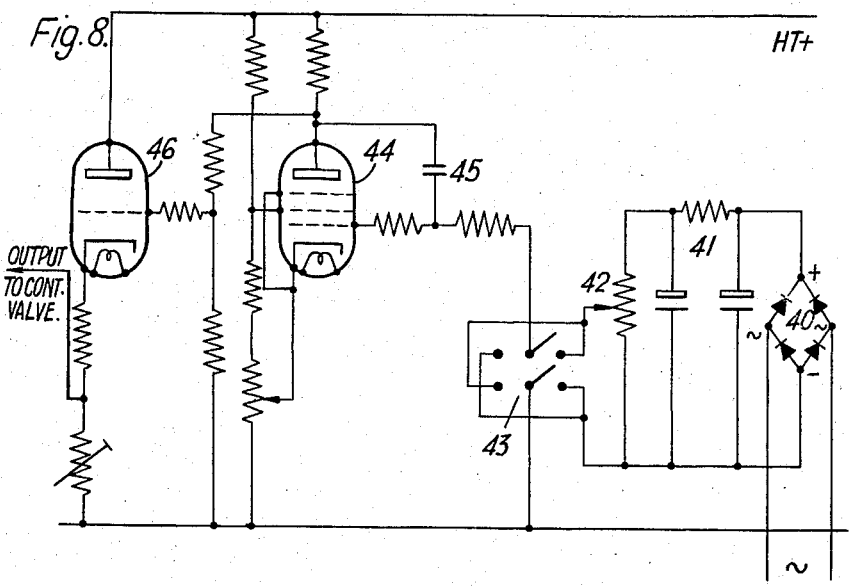
Inventor
Edmund S. Dewick
By
Wenderoth, Lind & Ponack
Attorneys United States Patent Office
2,960,667
Patented Nov. 15, 1960

2,960,667

VARIABLE NETWORK CONTROL

Edmund Saunders Dewick, St. Albans, England, assignor to Elliott Brothers (London) Limited, London, England Filed Sept. 24, 1958, Ser. No. 763,065

2 Claims. (Cl. 331—136)

This invention relates to alternating current networks and is particularly concerned with the provision of a network the properties of which may be readily and smoothly varied over a very wide range.

Resistance elements known as thermistors are available which are temperature sensitive and have a temperature coefficient of resistance which is usually negative and is many times greater than that of ordinary metals at ambient temperatures.

The invention in its broadest aspect contemplates the use of a thermistor as an element in an alternating current network in which the impedance of the element is controlled by direct current which is passed through it to vary its temperature. A thermistor may be used in this manner as a control element, for example in an attenuator or a phase shifting network to provide a very wide range of control. Preferably the magnitude of the direct current is controlled by means of a thermionic valve and for this purpose the thermistor may be connected as regards direct current in the anode or cathode circuit of a valve and means may be provided for adjusting the voltage on a control grid.

According to an important feature of the present invention a network embodying one or more thermistors is arranged as a phase shifting arrangement for controlling the frequency of operation of an oscillator, frequency selective amplifier, or filter circuit.

Figure 5:
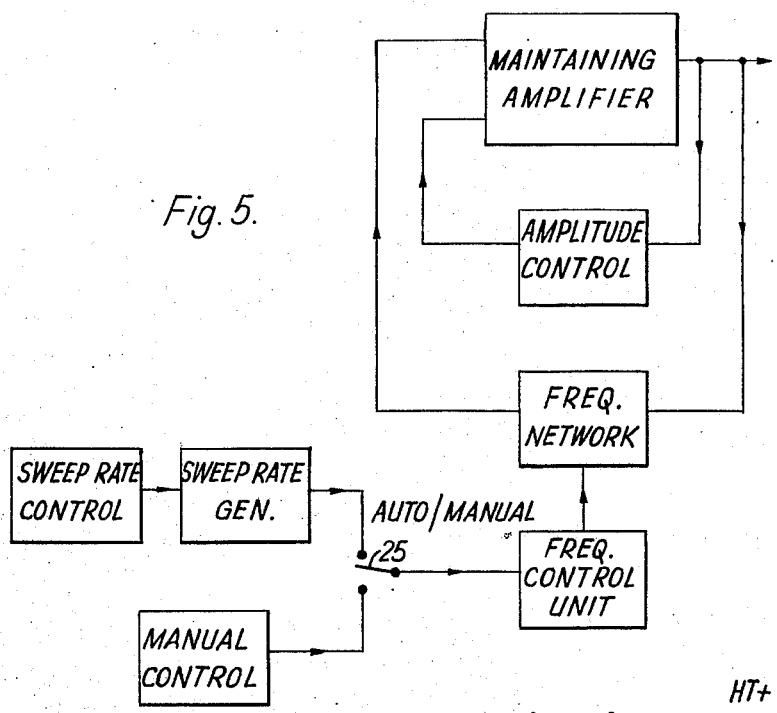
Figure 6:
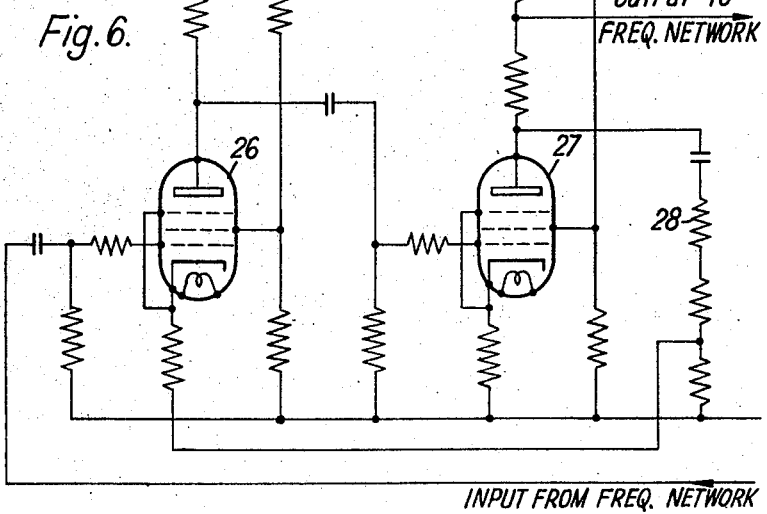

In order that the invention may be clearly understood examples of the application of thermistors as elements in an alternating current network and controlled by a direct current will now be described with reference to the accompanying drawings, in which:

Figures 1, 2, 3 and 4 are fragmentary circuit diagrams showing the application of a thermistor to provide variable attenuation or variable phase shift, while Figure 5 is a block diagram of a sweep frequency oscillator, Figures 6, 7 and 8 show circuit diagrams of parts of the arrangement of Figure 5, and Figure 9 shows a modification of part of the arrangement of Figure 5.

Referring to Figure 1, there is shown a thermistor 1 connected as regards alternating current in series with a resistor 2 between an input terminal 3 and HT+. The thermistor is also connected with the anode of a pentode valve 4 so that by applying a variable bias voltage to the control grid the direct current through the thermistor and hence its resistance may be varied. The thermistor 1 and resistor 2 form a potential divider and the attenuated output voltage is obtained at the output terminal 5. The condensers 6 and 7 are provided merely to isolate the direct current circuit from the alternating current circuit.

In the arrangement of Figure 2, a thermistor 8 and condenser 9 are arranged to form a known RC phase shifting circuit for alternating current applied to the input terminal 10, the extent of phase shift being a function of the impedance of the thermistor 8. As in the case of the arrangement of Figure 1, the impedance may be controlled by adjusting the grid bias of a pentode valve 11.

Figure 3 shows a circuit for producing a variable phase shift at constant amplitude. In this arrangement a condenser 14 and thermistor 15 are connected across the secondary winding 12 of a transformer 13. The impedance of the thermistor 15 is again controlled in order to adjust the phase shift by varying the grid potential of a valve 16, the thermistor being connected as regards direct current in series with half of the secondary winding 12 between HT+ and the anode of the valve 16.

Figure 4 illustrates the application of the invention to an RC network of known type for producing zero phase shift at a predetermined frequency. The network comprises a thermistor 18 and a condenser 19 in parallel and a further thermistor 20 and condenser 21 in series and produces zero phase shift at a frequency $$\tfrac{1}{2}\pi\sqrt{R_1 C_1 R_2 C_2}$$

where $R_1$ and $R_2$ are the resistances of the two thermistors and $C_1$ and $C_2$ are the capacities of the condensers 19 and 21. To provide a control of the frequency at which zero phase shift is produced, the thermistors are connected in series between HT+ and the anode of a valve 22 and the anode current is controlled by adjusting the bias on the control grid of this valve.

It is of course known to use mechanically variable resistors or condensers in a network of this kind and with such arrangement a frequency ratio of 10:1 or at the most 20:1 is practicable. Using thermistors, however, very much higher ratios, such as 200:1 can be readily obtained.

According to an important feature of the invention a zero phase shift circuit as shown in Figure 4 is used in the construction of a sweep frequency oscillator, frequency selective amplifier, or filter and one example of such arrangement will now be described with reference to Figures 5 to 8 of the drawings.

Referring firstly to Figure 5, which shows the constituent parts of the arrangement as a block diagram, the arrangement comprises a maintaining amplifier which is provided with negative feedback through an amplitude control and positive feedback through a frequency network of the kind described with reference to Figure 4. The properties of the frequency network are adjusted by a frequency control unit and this in turn is arranged for control by a manual or by an automatic control according to the adjustment of a switch 25. For automatic control there is provided a sweep rate generator and a sweep rate control. The maintaining amplifier is shown in Figure 6 and as can be seen comprises two valves 26 and 27 which are connected to operate as an amplifier having a suitable gain over the frequency range concerned. Controlled negative feedback from the anode circuit of the valve 27 to the cathode circuit of the valve 26 is provided over a circuit including a thermistor 28 which operates to maintain a constant gain in known manner. The construction and arrangement of the amplifier shown in Figure 6 is entirely conventional and the circuit need not be described in further detail.

Figure 7 shows the elements of the frequency network and frequency control units. The arrangement comprises two thermistors 29 and 30 and condensers 31 and 32 arranged in a network as shown in Figure 4. This network is connected across the output of the valve 27 of the amplifier shown in Figure 6 and the junction of the thermistors 29 and 30 is connected over the lead 33 with the grid of the valve 26 of the amplifier shown in Figure 6. This connection, apart from the use of thermistors, is again entirely conventional and the amplifier of Figure 6 in conjunction with the network 29–32 constitutes an oscillator with automatic amplitude control, assuming appropriate adjustment of the magnitude of the positive and negative feedback.

The adjustment of the properties of the network 29–32 is effected by means of a valve 34 which is arranged as a direct current amplifier controlling the direct current flowing through the thermistors 29 and 30. With the switch 25 operated to provide manual control, the bias on the control grid of the valve 34 may be adjusted by means of the potential divider 35 which may be calibrated to give an approximate indication of the frequency of oscillation. In the other position of the switch, the bias on the control grid of the valve 34 is provided by the sweep rate generator which is shown in detail in Figure 8.

This unit includes a rectifier 40 which is energised from a suitable source of alternating current and provides a direct current voltage smoothed by the resistance/condenser combination 41 across a potential divider 42. This voltage is applied through a switch 43, which enables the polarity of the voltage to be reversed, to an integrating circuit which is of known type including the valve 44 and condenser 45. The change in potential at the anode of the valve 44 is applied to the grid of a cathode follower valve 46 and the cathode circuit of this valve is connected with one terminal of the switch 25 in Figure 7.

In operation, when the voltage from the potential divider 42 is applied to the integrating circuit, the anode current of the valve 44 will change at a controlled rate dependent on the magnitude of the applied voltage and in a direction dependent on the polarity of this voltage. The voltage change at the anode of the valve 44, suitably transformed by means of the cathode follower 46, is applied to the control valve 34 (Figure 7) and thus varies the current flowing through the thermistors 29 and 30 at a suitable rate. Accordingly, by suitable selection of the voltage from the potential divider 42 the frequency of oscillation of the arrangement may be caused to vary at a controlled rate with time and when the frequency has reached one of its limiting values may be caused to change at a controlled rate in the opposite direction by a change of the polarity of the voltage applied to the integrator. Moreover, if at any time it is desired to hold the frequency of oscillation constant, the voltage obtained from the potential divider 42 may be reduced to zero.

In practice it has been found that the combination of the characteristics of a thermistor and a pentode valve in the manner described results in a frequency-time relationship which is approximately proportional to a number of octaves per minute; variations of this law can be obtained by appropriate alteration of the circuit.

In one oscillator constructed in accordance with this invention a frequency range of from 25 c.p.s. to 10 kc./s. was provided and the rate of sweep was variable from five octaves a minute to zero with either a rising or falling frequency. The actual frequency range provided is, however, determined by the constants of the frequency network (Figure 7), the amplifier having linear response over a wide frequency range.

As a further example of the arrangement Figure 9 shows a modification of part of the block diagram of Figure 5 to provide a frequency selective amplifier capable of automatic or manual frequency adjustment in the same manner as described in the above example.

What I claim is:

1. Electronic apparatus including an amplifier having a positive feedback circuit connecting the output circuit of said amplifier with the input circuit, a frequency selective network including a thermistor as one element thereof in said feedback circuit, a direct current control circuit including a pentode control tube having an anode-cathode path in series with said thermistor and a control electrode, and means for varying the bias on said control electrode at a predetermined rate, said means comprising an integrating circuit including an integrating tube having a capacitor connected between the anode and a control grid of said integrating tube, switch means for effecting a sudden change in potential of predetermined magnitude and polarity on said control grid of said integrating tube, and means for applying the resulting slow change of anode potential of said integrating tube to the control electrode of said control tube.

2. Electronic apparatus including an amplifier having a negative and a positive feedback circuit connecting the output circuit of said amplifier with the input circuit, a frequency selective network in said positive feedback circuit, said network including a first and a second thermistor connected in series, a first capacitor connected in series with said first thermistor and a second capacitor connected in parallel with said second thermistor, a direct current circuit including a pentode type control tube having an anode-cathode path in series with said first and second thermistor and a control electrode, and means for varying a bias potential on said control electrode at a predetermined rate, said means comprising an integrating circuit including an integrating tube having a capacitor connected between the anode and control grid of said integrating tube, switch means for effecting a sudden change in potential of predetermined magnitude and polarity on said control grid of said integrating tube, and a cathode follower tube having a control grid directly connected with the anode of said integrating tube and a cathode directly connected with the control electrode of said control tube.

References Cited in the file of this patent

UNITED STATES PATENTS

| | | |
|---|---|---|
| 2,418,842 | Kinsburgh | Apr. 15, 1947 |
| 2,516,906 | Ostlund et al. | Aug. 1, 1950 |
| 2,544,017 | Golicke | Mar. 6, 1951 |

FOREIGN PATENTS

| | | |
|---|---|---|
| 497,148 | Great Britain | Dec. 12, 1938 |